United States Patent [19]

Derrien

[11] Patent Number: 5,294,077
[45] Date of Patent: Mar. 15, 1994

[54] SHOCK-ABSORBING ACTUATOR FOR FITTING TO LANDING GEAR OF HEAVIER-THAN-AIR AIRCRAFT, IN PARTICULAR HELICOPTERS

[75] Inventor: Michel Derrien, Versailles, France

[73] Assignee: Messier-Bugatti, Velizy Villacoublay, France

[21] Appl. No.: 37,416

[22] Filed: Mar. 26, 1993

[30] Foreign Application Priority Data

Mar. 31, 1992 [FR] France ............................ 92 03878

[51] Int. Cl.$^5$ ............................................. B64C 25/58
[52] U.S. Cl. ........................... 244/104 FP; 244/104 R; 244/102 R
[58] Field of Search ........ 244/104 FP, 104 R, 102 SS, 244/102 A, 102 R

[56] References Cited

U.S. PATENT DOCUMENTS

| | | | |
|---|---|---|---|
| 2,554,581 | 5/1951 | Levy | 244/102 R |
| 4,273,303 | 6/1981 | Somm | 244/104 FP |

FOREIGN PATENT DOCUMENTS

| | | |
|---|---|---|
| 0014660 | 8/1980 | European Pat. Off. . |
| 0051506 | 5/1982 | European Pat. Off. . |
| 0275735 | 7/1988 | European Pat. Off. . |

*Primary Examiner*—Michael S. Huppert
*Assistant Examiner*—Anne E. Bidwell
*Attorney, Agent, or Firm*—Sixbey, Friedman, Leedom & Ferguson

[57] ABSTRACT

The invention relates to a shock-absorbing actuator including a cylindrical body and a hollow rod having an annular piston. The cylindrical body includes a separator piston delimiting two hydraulic fluid chambers, one of which communicates via a distributor valve with the hydraulic circuit of the aircraft, said distributor valve being closed automatically at the end of lowering the landing gear; the annular chamber communicates via a second distributor valve with said hydraulic circuit. The distributor valves thus make it possible to extend and retract the shock-absorbing actuator. In addition, a force peak-limiting means is disposed in an extension extending beyond an end wall of the body that forms one of the abutments for the separator piston.

14 Claims, 2 Drawing Sheets

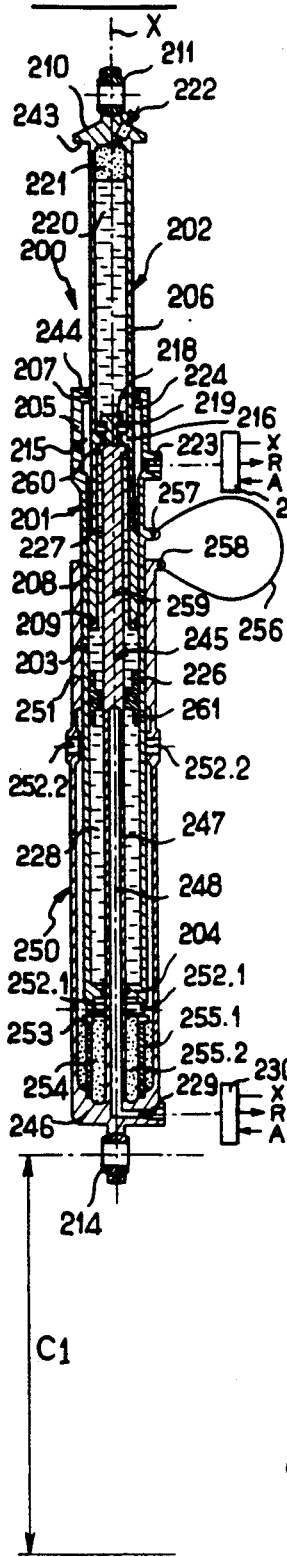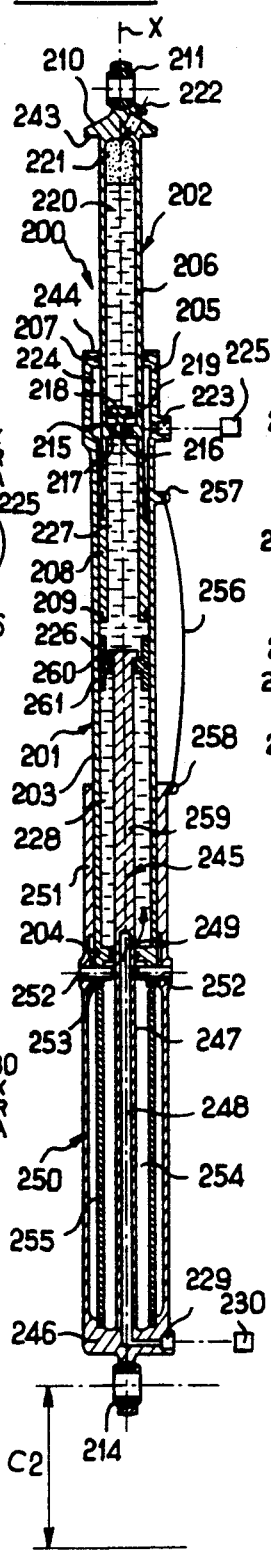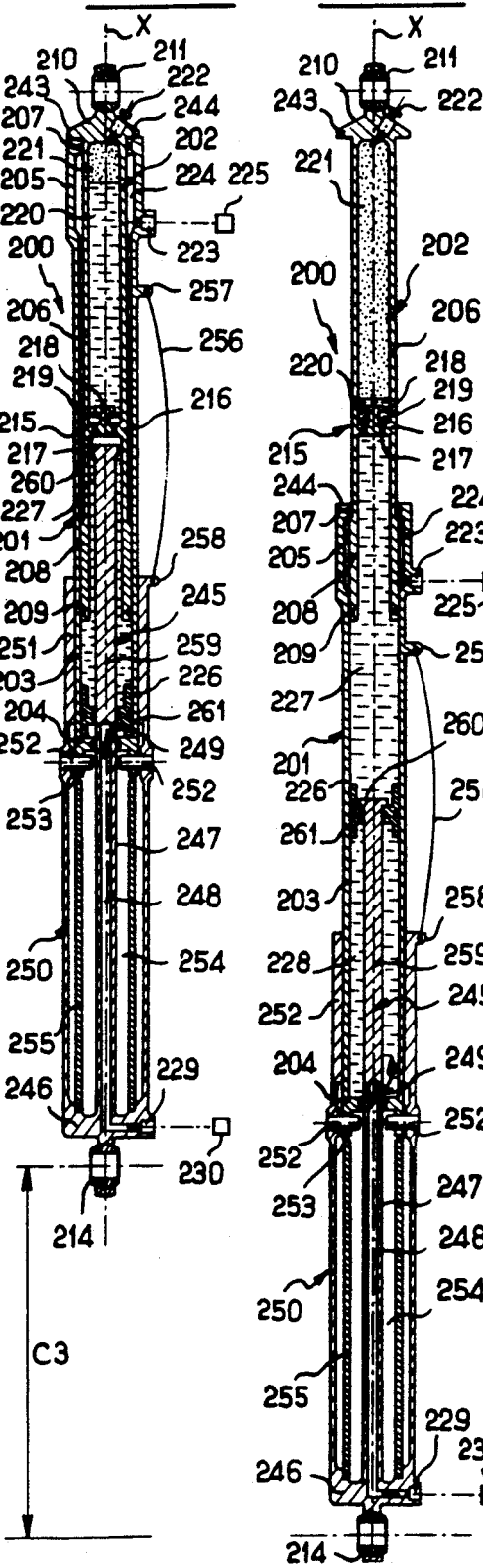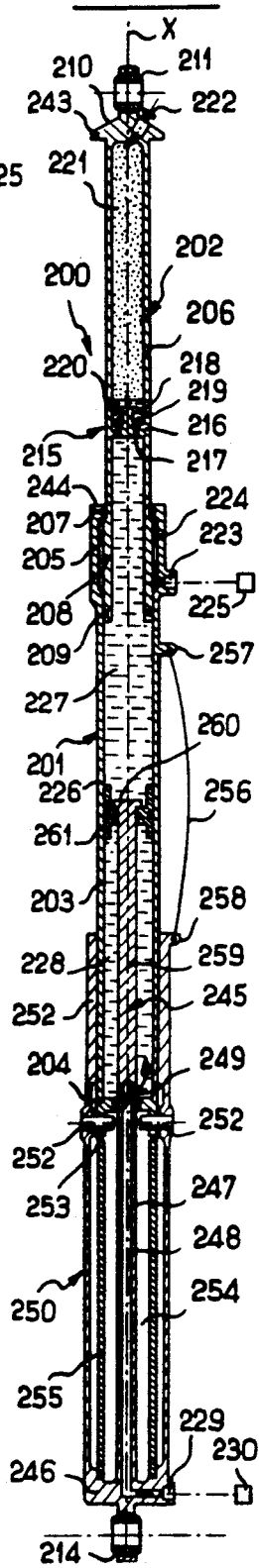

SHOCK-ABSORBING ACTUATOR FOR FITTING TO LANDING GEAR OF HEAVIER-THAN-AIR AIRCRAFT, IN PARTICULAR HELICOPTERS

The present invention relates to a shock-absorbing actuator for fitting to the landing gear of heavier-than-air aircraft, and in particular to helicopters, the shock-absorbing actuator being designed to be capable of coping with landing under emergency conditions (commonly called a crash landing).

BACKGROUND OF THE INVENTION

Firstly, it should be recalled that in the particular case of helicopters, the system designed to absorb energy generally includes provision to limit force peaks in the event of the helicopter falling at high speed due to a breakdown of its support system. When the landing gear of the helicopter is of the rocker type, the shock absorber for normal use is hinged at its bottom end to the rocker arm and at its top end to the structure of the helicopter, and it extends substantially vertically, such that the reaction from the ground via the associated wheel or wheels tends to pivot the rocker arm and thrust the rod of the shock absorber into the body thereof. As a result, in the event of a crash landing, since the vertical impact speed is much greater than in normal operation, it is necessary to provide force peak-limiting means capable of coming into action as quickly as possible.

Thus, shock absorbers are known having a low-pressure chamber and fitted with force peak-limiting means in the form of a separator piston delimiting a chamber containing gas under high-pressure. In that case, under conditions of normal use, the vertical reaction from the ground causes the rod to be retracted into the main body, thereby compressing a volume of gas contained in the low-pressure chamber, with said retraction movements being braked by a throttling device. In contrast, in the event of a crash landing, since the impact speed is much higher, the pressure induced by the throttling device is communicated by the oil in the separator piston cylinder, and since the pressure then applied to the separator piston exceeds the pressure to which the high-pressure chamber is inflated, said piston moves downwards, compressing said chamber.

Such shock absorbers are used at present for fitting to the landing gear of airplanes or of helicopters, however they are not designed also to provide an actuator function for lowering and raising drive purposes, such that said actuator function is provided by a separate driving actuator.

In some cases, there is a requirement for a shock absorber that is also capable of providing an actuator function, which we refer to as a "shock-absorbing actuator".

A shock-absorbing actuator is already known that comprises a cylindrical body, and a hollow rod having an open end forming an annular piston that slides in sealed manner inside the cylindrical body, together with hydraulic shock-absorbing means including a diaphragm and surmounted by a volume of hydraulic fluid that delimits a chamber containing gas (e.g. nitrogen) at low-pressure, and also force peak-limiting means that act in the event of a crash landing.

Document FR-A-2 608 242 describes a shock-absorbing actuator of that type, and more precisely it comprises a main body disposed below a rod-piston, the bottom end of the main body including a high-pressure chamber which is adjacent to a low-pressure chamber via a flexible separation membrane capable of bearing against a perforated rigid support secured to said body, together with a throttling device that brakes the displacements of the rod inside the main body by throttling the fluid contained in said body and adjacent to the low-pressure chamber. The rod-piston is hollow, and it receives a separator piston that delimits two hydraulic chambers. The throttling device includes a central pressure-release valve that acts in the event of the rod being forced in suddenly, and the device is also associated with a cylindrico-conical tube that absorbs energy by undergoing plastic deformation.

The shock-absorbing actuator described in the above-specified document provides the actuator function by connecting the two hydraulic chambers to a hydraulic distributor valve block. The chambers comprise a chamber for retracting or raising the landing gear by causing the rod to be retracted into the body, and a landing gear lowering or extending chamber that causes the rod to extend out from the body, and the hydraulic distributor valve block is capable of feeding hydraulic fluid under pressure to said chambers or of allowing them to empty into the tank of the aircraft's hydraulic circuit.

Such a shock-absorbing actuator nevertheless remains relatively complicated, and in particular it requires a throttling device that is servo-controlled in velocity, and which needs to be adjusted accurately.

OBJECTS AND BRIEF SUMMARY OF THE INVENTION

An object of the invention is to design a shock-absorbing actuator which is effective in the event of a crash landing while simultaneously requiring a minimum number of components.

Another object of the invention is to provide a shock-absorbing actuator in which the force peak-limiting means comes into play automatically in the event of a crash landing without requiring a special valve member that is servo-controlled to velocity, and whose structure makes it possible for the actuator function to make use of a relatively small volume of hydraulic fluid.

More particularly, the present invention provides a shock-absorbing actuator for fitting to the landing gear of heavier-than-air aircraft, in particular helicopters, the actuator comprising a cylindrical body and an open-ended hollow rod forming an annular piston that slides in sealed manner inside the cylindrical body, together with hydraulic damping diaphragm means surmounted by a volume of hydraulic fluid delimiting a low-pressure gas chamber, and force peak-limiting means that come into play in the event of a crash landing, wherein the cylindrical body includes a separator piston that is movable between two associated abutments and delimiting two hydraulic fluid chambers, one of which communicates directly with the inside of the hollow rod in which the hydraulic damping diapgragm means is disposed, and the other of which communicates via a first distributor valve with the hydraulic circuit of the aircraft, said first distributor valve being automatically closed at the end of lowering the landing gear, said cylindrical body and said hollow rod also delimiting an annular chamber which also communicates via a second distributor valve with said hydraulic circuit, said first and second distributor valves thus making it possible to cause the shock-absorbing actuator to extend or retract in order to lower or raise the landing gear, and wherein the force peak-limiting means is disposed in an extension extending beyond an end wall of the cylindrical body forming one of the abutments of the separator piston.

In a first embodiment, the force peak-limiting means includes a high-pressure gas chamber disposed in an extension of the cylindrical body.

It is then preferable for a moving rod-piston to be associated with the high-pressure chamber, a piston sliding in said chamber, and a rod passing through an intermediate end wall of the cylindrical body, said intermediate end wall forming an abutment for the separator piston and having direct communication means including a floatingly-mounted valve member. In particular, the hydraulic fluid chamber delimited by the intermediate end wall of the cylindrical body and by the separator piston communicates with the hydraulic circuit of the aircraft via a first orifice of said body disposed in the vicinity of said intermediate end wall.

In a particular embodiment, the separator piston slides on the rod of the moving rod-piston, and the other abutment of said separator piston is carried by said rod; in addition, the rod of the moving rod-piston is terminated by an enlargement which constitutes both the other abutment for the separator piston, and an abutment for the hollow rod in a normally-retracted position. It is also advantageous for the outside of the hollow rod to have an end-of-stroke abutment that co-operates with the free edge of the cylindrical body to limit the retraction stroke in the event of a crash landing.

In another variant embodiment, the force peak-limiting means comprises a tube which provides the desired energy absorption on being crushed, said tube being received in an extension body which telescopically receives the cylindrical body.

It is then advantageous for the cylindrical body and the extension body to be connected together by at least one shear pin that is designed to break under a predetermined force.

It is also advantageous for the extension body to carry a central hollow rod that passes through the end wall of the cylindrical body that forms an abutment for the separator piston, said hollow rod having a lateral orifice whereby the hydraulic fluid chamber delimited by said end wall and said separator piston communicates with the hydraulic circuit of the aircraft via an associated orifice of the extension body.

It is then preferable for the separator piston to slide on the central hollow rod of the extension body, and for the other abutment of said separator piston to be carried by said central hollow rod. In a particular embodiment, the central hollow rod is terminated by an enlargement which constitutes both the other abutment of the separator piston and an abutment for the hollow rod limiting the retraction stroke in the event of a crash landing.

It is also advantageous for the hollow rod to have an outer end-of-stroke abutment co-operating with the free edge of the cylindrical body at the end of normal retraction.

Also preferably, deformable anti-rotation means, e.g. a spring blade, is provided between the cylindrical body and the extension body.

BRIEF DESCRIPTION OF THE DRAWINGS

Other features and advantages of the invention appear more clearly in the light of the following description and the accompanying drawings which relate to particular embodiments, and in which:

FIGS. 2a, 2b, 2c, and 2d are sections through a variant of the shock-absorbing actuator, shown in the same relative positions as those mentioned above, this shock-absorbing landing gear including force peak-limiting means including a composite tube which provides the desired energy absorption by being crushed.

MORE DETAILED DESCRIPTION

FIGS. 1a to 1d show a shock-absorbing actuator 100 of the invention for fitting to the landing gear of an aircraft, e.g. to a helicopter landing gear. The shock-absorbing actuator 100 comprises a cylindrical body 101 and a hollow rod 102 that slides in sealed manner inside the cylindrical body along the axis X thereof.

Figure 1A:
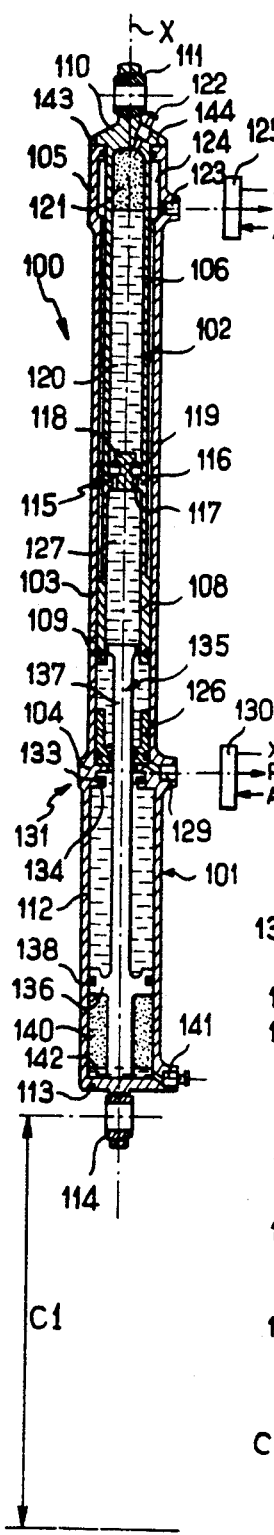
FIGS. 1a, 1b, 1c, and 1d are axial sections through a shock-absorbing actuator of the invention with its component parts shown in various different relative positions, i.e. respectively in the retracted position corresponding to the landing gear being raised in a crash landing situation, in a position corresponding to normal static or dynamic loading, in a retracted position corresponding to the end of normal raising, and in a fully-extended position (relaxed position after the landing gear has been lowered)
Figure 1B:
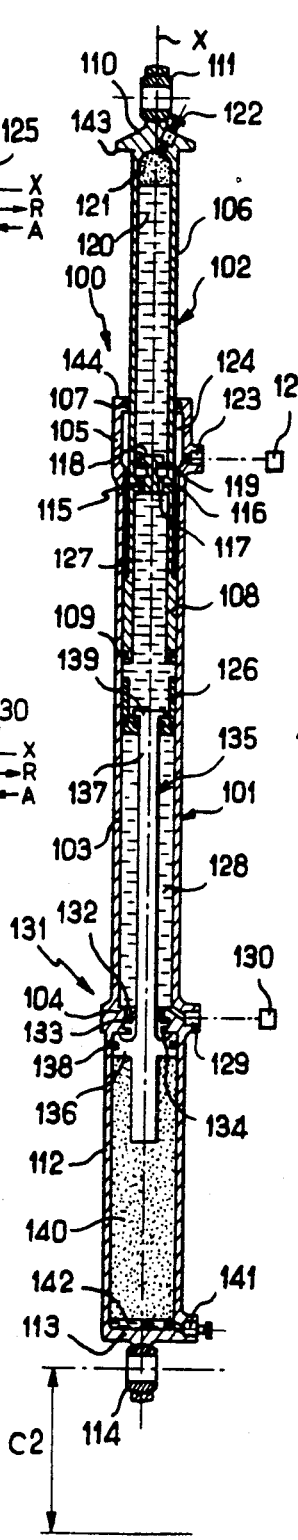

The rod of the shock-absorbing actuator 100 may be hinged to the structure of the aircraft, and its body may be hinged to the raisable landing gear of said aircraft. In particular, for a helicopter, the top end 110 of the hollow rod 102 is hinged via a swivel-jointed endpiece 111 to the structure of the helicopter, while the cylindrical body 101 is hinged via a swivel-jointed endpiece 114 on the rocker arm of the landing gear, which is itself also hinged to the structure of the helicopter so that when the actuator is in its fully extended position as shown in FIG. 1b, the landing gear is lowered, while the retracted position of FIG. 1c corresponds to the landing gear being raised.

The following description with reference to FIGS. 1a to 1d begins with the structural components of the shock-absorbing actuator 100, and then continues with the various positions that can be taken up by said shock-absorbing actuator.

Inside the cylindrical body 101, the hollow rod 102 has an open end with a rod portion 106 and a piston portion 108, and it slides in sealed manner inside the cylindrical body 101 by virtue of associated sealing rings 107 and 109. The hollow rod 102 is also fitted with hydraulic damping diaphragm means 115 surmounted by a volume of hydraulic fluid 120 which delimits a chamber containing gas under low-pressure 121, the closed end 110 of the hollow rod 102 including a filling and inflation valve 122. The hydraulic damping diaphragm means may be of conventional type as shown herein, having an intermediate partition 116 with through orifices 117 and surmounted by a central peg 118 on which a floatingly-mounted valve member 119 slides, with its stroke being limited by an enlargement at the end of the peg 118. When the floatingly-mounted valve member 119 is lifted off the partition 116, the hydraulic fluid flows through the orifices 117 into the chamber 120, with this corresponding to a stage during which the low-pressure chamber 121 is compressed. Conversely, when the floatingly-mounted valve member 119 bears against the end partition 116, it controls throttling by means of holes (not visible in the drawing)

provided in conventional manner to coincide with at least some of the through orifices 117.

The cylindrical body 101 has a main portion 103 delimited at its bottom by an end wall 104 and at its top by an enlarged portion 105 which co-operates with the rod-piston 102 to define an annular chamber 124.

According to an essential aspect of the invention, the cylindrical body 101 includes a separator piston 126 delimiting two hydraulic fluid chambers 127 and 128, one of which (in this case the chamber 127) is in direct communication with the inside of the hollow rod 102, while the other one (in this case the chamber 128) is in communication via a first distributor valve 130 with the hydraulic circuit of the aircraft, and the annular chamber 124 is also in communication with said hydraulic circuit via a second distributor valve 125. In this case, the main portion 103 of the cylindrical body 101 has an end orifice 123 for connection to the distributor valve 125, and in the vicinity of its wall 104, it has an orifice 129 for connection to the distributor valve 130.

The first and second distributor valves 130 and 125 enable the shock-absorbing actuator to be extended or retracted for the purpose of lowering or raising the landing gear, and the first distributor valve 130 is also organized so as to be closed automatically when the landing gear has been lowered fully (e.g. by means of a special sensor or an appropriate time-out). In FIG. 1a, there can thus be seen two distributor valves 125 and 130 each having three connection lines referenced X, R, and A, which lines are respectively associated with closing, returning to the circuit tank, and admitting fluid under pressure (for greater clarity, the same distributor valves are represented diagrammatically only in FIGS. 1b, 1c, and 1d).

In accordance with another feature of the invention, the shock-absorbing actuator 100 includes force peak-limiting means organized in an extension 112 extending beyond the above-mentioned end wall 104 of the cylindrical body 101, which end partition forms one of the abutments for the separator piston 126.

In the present case, the extension 112 is merely an extension of the cylindrical body 101 terminated by an end wall 113 on which the above-mentioned swivel-jointed endpiece 114 is disposed that is associated with the hinge to the rocker arm of the landing gear. The end wall 104 is thus constituted by an intermediate end wall such that a chamber 140 of high-pressure gas is delimited inside the extension 112, between end walls 104 and 113, said chamber being inflated via an associated valve 141, and a small quantity of hydraulic fluid 142 being provided in conventional manner on the bottom 113 of said high-pressure chamber.

Figure 1C:
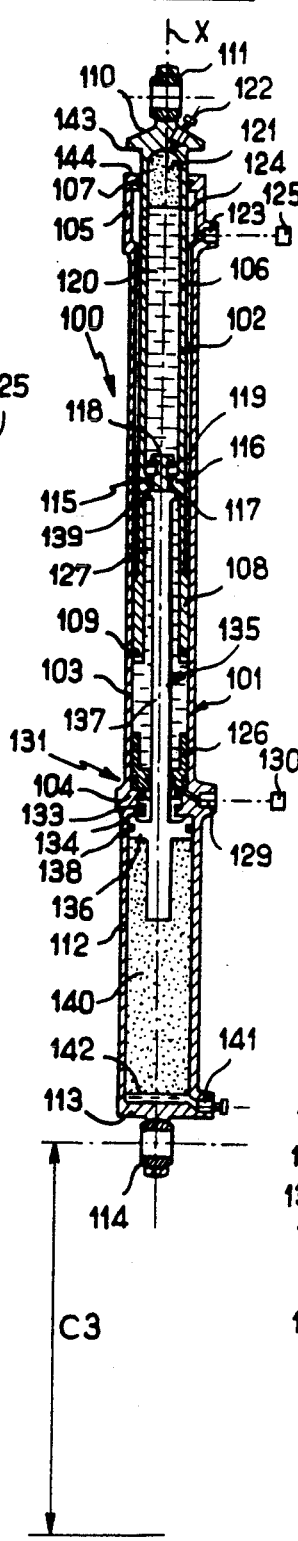
Figure 1D:
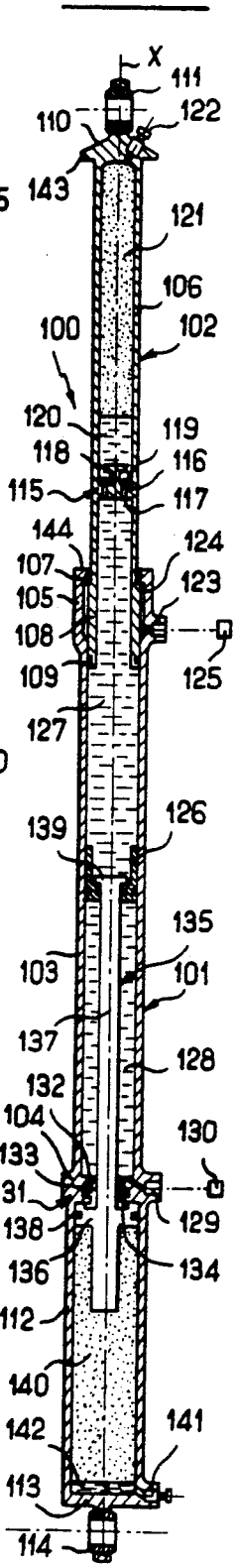

The force peak-limiting means further comprise a moving rod-piston 135 which is associated with the high-pressure chamber 140, having a piston 136 that slides in sealed manner by means of an associated sealing ring 138 inside the high-pressure chamber 140, and a rod 137 that passes through the intermediate end wall 104 of the cylindrical body 101. The intermediate end wall 104 includes communications means 131 having through orifices 132 and, adjacent to the piston 136, a floatingly-mounted valve member 133 whose lift stroke off the above-mentioned orifices is limited by an associated abutment. Although not essential in any way, in the present example, the separator piston 126 slides on the rod 137, said piston having sealing rings (not referenced) to provide sliding sealing relative to the rod 137 and also relative to the inside surface of the cylindrical body 103. It is then advantageous to provide for the rod 137 to terminate by an enlargement 139 that constitutes the other abutment of the separator piston 126, in addition to the first abutment constituted by the intermediate end wall 104. The separator piston 126 can thus move between a low abutment position (e.g. as shown in FIGS. 1a and 1c), and a high abutment position against the enlargement 139 of the rod 137 (as shown in FIGS. 1b and 1d). In addition, as can be seen in FIG. 1c, the enlargement 139 of the rod 137 performs an additional function, by also constituting an abutment for the hollow rod 102 in the normal retraction position.

In the event of a crash landing, provision is made in this case for a retraction stroke that is greater than that to be found at the end of raising the landing gear, with the stroke then being limited by co-operation between an abutment 143 secured to the end 110 of the hollow rod 102 and the free edge 144 of the end 105 of the cylindrical body 101.

The operation of the shock-absorbing actuator 100 is now described in detail, with reference to the various relative positions of its component elements as shown in FIGS. 1a, 1b, 1c, and 1d.

When the landing gear is raised, the shock-absorbing actuator 100 is in its retracted position as shown in FIG. 1c. In this position, the separator piston 126 is in bottom abutment against the intermediate end wall 104, and the hollow rod 102 is in abutment via its partition 116 against the end 139 of the rod 137. The retraction stroke relative to the completely relaxed shock-absorbing actuator (as shown in FIG. 1d) is referenced C3. When the landing gear starts to be lowered, the distributor valve 125 is actuated so as to put the orifice 123 of the annular chamber 124 into communication with the tank of the aircraft's hydraulic circuit via a line R (the tank is not shown), and the distributor valve 130 serves to admit fluid under pressure via the orifice 129 (from the line A). The separator piston 126 initially lifts off the intermediate end wall 104 and thrusts the hollow rod 102 out from the cylindrical body 103 until said separator piston comes into top abutment against the enlargement 139 of the rod 137. Extension then continues by the hollow rod 102 being fully extended, with a certain volume of fluid in the chamber 120 passing into the chamber 127 under drive from the gas contained in the low-pressure chamber 121. The final position is then as illustrated in FIG. 1d, and once this position has been reached, the distributor valve 130 closes automatically (line X).

Providing landing takes place within conditions that are considered to be normal (i.e. with a vertical velocity component whose value remains below a predetermined limit such as 3 meters per second (m/s) to 4 m/s), then the shock-absorbing actuator 100 behaves like a conventional shock absorber. Because the distributor valve 130 has been closed automatically at the end of lowering the landing gear, the hydraulic fluid contained in the chamber 128 and the separator piston 126 on top of said volume together constitute a rigid monolithic assembly which is equivalent to an end wall for the shock-absorbing actuator. Under such circumstances, the fluid in the chamber 127 passes via the orifices 117 into the hydraulic chamber 120, thereby compressing the gas in the low-pressure chamber 121, with the floatingly-mounted valve member 119 rising during this movement of the fluid. FIG. 1b thus shows a position which corresponds to the shock-absorbing actuator under a static or a dynamic load, with the retraction stroke thereof relative to the fully extended position being referenced C2.

Thus, so long as forces remain below a predetermined threshold, whose value is given by the pressure of the gas in the high-pressure chamber 140, the entire bottom portion of the shock-absorbing actuator behaves like an inert and monolithic assembly.

In contrast, in the event of a crash landing, i.e. if the forces transmitted by the wheels of the landing gear tend to cause the hollow rod to be forced suddenly into the cylindrical body, then the force peak-limiting means is automatically brought into play, i.e. a large fraction of the hydraulic fluid contained in the hydraulic chamber 128 and which concerns the fluid of the aircraft's circuit, passes quickly into the extension 112, pushing back the piston 136 of the moving rod-piston 135 and compressing the gas in the high-pressure chamber 140. A certain volume of fluid also passes into the chamber 120 of the hollow rod 102, thereby compressing the gas in the low-pressure chamber 121. The shock-absorbing actuator 100 is thus capable of retracting very quickly while absorbing energy, and this can continue until an abutment position which is given in this case by the abutment 143 of the hollow rod coming into contact with the top edge 114 of the cylindrical body. The final position is then as shown in FIG. 1a, and the retraction stroke relative to the fully extended position of FIG. 1d is referenced C1. It should be observed that the floatingly-mounted valve member 133 which uncovers the orifices 132 while hydraulic fluid is passing into the high-pressure chamber 140, comes back over these orifices once the final position has been achieved and serves to control expansion by means of appropriate boreholes (not visible in the drawing), thereby making it possible to avoid any bounce effect which would be unfavorable.

After take-off, the shock-absorbing actuator 100 moves progressively from the position shown in FIG. 1b to the fully extended position shown in FIG. 1d. Thereafter, the distributor valve 130 is actuated to empty the fluid chamber 128 via the line R, and the distributor valve 125 admits fluid under pressure from the line A via the associated orifice 123. Emptying the fluid chamber 128 causes the separator piston 126 to move down until it comes into low abutment against the intermediate end wall 104. Finally, the fluid passing into the hollow rod 102 compresses the gas in the low-pressure chamber 121 and the hollow rod continues to be retracted into the cylindrical body until it comes into abutment against the enlargement 139 of the then-stationary rod-piston 139. The shock-absorbing actuator finally achieves the raised position as shown in FIG. 1c. Once the landing gear has been raised, the distributor valve 125 closes the orifice 132 so as to lock the shock-absorbing actuator in position.

By way of example, a shock-absorbing actuator fitted to helicopter landing gear and having the structure described above, makes the following retraction strokes available: C1=620 mm, C2=250 mm, and C3=580 mm.

The shock-absorbing actuator 100 as described above has numerous practical advantages: in addition to the simplicity of its structure, it enables forces to be peak-limited automatically by the high-pressure chamber so that there is no need to provide a special distributor valve that is servo-controlled to velocity, and in addition the volume of hydraulic fluid that is associated with the actuator function is relatively small.

FIGS. 2a, 2b, 2c, and 2d show another variant of a shock-absorbing actuator in accordance with the invention, with the actuator being shown in the same relative positions as those described above with reference to FIGS. 1a to 1d, said shock-absorbing actuator differing from the above actuator essentially in the structure and the organization of its force peak-limiting means.

The shock-absorbing actuator 200 shown therein has numerous components that are identical or analogous to components of above-described shock-absorbing actuator 100, and such components are given the same reference numerals plus 100, and they are not described again.

The shock-absorbing actuator 200 comprises a cylindrical body 201 and a hollow rod 202. The hollow rod is identical to that of the above shock-absorbing actuator and it slides in the same way in the top portion of the cylindrical body 201. In contrast, the bottom portion of the cylindrical body is telescopically received in an extension body 250 which has an end wall 246 with the swivel-jointed hinged endpiece 214 mounted thereon, e.g. for association with the rocker arm of the landing gear.

In accordance with an essential aspect of this variant, the force peak-limiting means includes a tube 255 received in said extension body 250, which tube provides the required energy absorption on being crushed.

In this case, the extension body 250 has a hollow central rod 245 connected to the end wall 246 of said body. This central rod is hollow at least as far as the end wall 204 of the cylindrical body 201, and it passes through said end wall 204 (which in this case is no longer an intermediate end wall) forming a bottom abutment for the separator piston 226. The central hollow rod 245 thus includes a hollow bottom portion 247 whose central duct 248 opens out at one end via an associated channel formed through the end wall 246 level with an orifice 229 in the extension body 250 associated with the first distributor valve 230, and it opens out at its other end level with a lateral orifice 249 situated above the end wall 204 so long as operating conditions remain normal. In this case, the separator piston 226 has a bottom extension 261 such that when the separator piston is in its low abutment position (as shown in FIG. 2c), the lateral orifice 249 is not masked by the transverse wall of said piston. A composite tube 255, e.g. made of carbon fibers and of resin, is interposed between the end wall 246 of the extension body 250 and the bottom edge 253 of the cylindrical body, being disposed in an associated rear chamber 254.

The cylindrical body 201 and the extension body 250 are also connected together, e.g. by means of a pin 252 (in this case two pins are shown) designed to shear when subjected to a predetermined force. The value of this shear force should be close to the threshold as determined by the pressure in the high-pressure chamber in the above-described variant. The hollow central rod 245 thus makes it possible to establish communication between the hydraulic fluid chamber 228 (delimited by the end wall 204 and the separator piston 226) and the hydraulic chamber of the aircraft, via the lateral orifice 229 of the extension body 250. In addition, the hollow central rod 245 is extended upwardly by a portion 259 (solid in this case) on which the separator piston 226 slides, in the same way as the moving rod-piston of the embodiment described above. As before, the hollow central rod 245 may be terminated by an enlargement 260 which constitutes both the other abutment for the separator piston 226 and an abutment for the hollow rod 202. However, the latter abutment is used in this case to limit the retraction stroke in the event of a crash landing, as shown in FIG. 2a. Finally, the hollow rod 202 has an external end-of-stroke abutment 243 co-operating with the free edge 244 of the cylindrical body 201, but said co-operation occurs in this case at the end of normal retraction, as shown in FIG. 2c.

Finally, the presence of deformable anti-rotation means should be observed, implemented in this case in the form of a spring blade 256 which is provided between the cylindrical body 201 and the extension body 250: each of the above-mentioned bodies has an appendix (respectively referenced 257 and 258) serving for fixing the anti-rotation sprint blade 256. Because of its own resilience, this blade does not oppose relative sliding between the cylindrical body 201 and the extension body 250 (such telescopic sliding taking place, in fact, only during a crash landing, as shown in FIG. 2a). In addition, in all positions of the shock-absorbing actuator 200, said spring blade 256 prevents the cylindrical body 201 rotating relative to the extension body 250, thereby avoiding any risk of admission duct associated with the bottom orifice 229 of said extension body being torn off.

As for the distributor valves 225 and 230, they are shown with their associated lines X, R, and A in FIG. 2a, only.

Starting from the retracted position shown in FIG. 2c, which is the position that applies to the end of raising the landing gear, and assuming that it is desired to extend the shock-absorbing actuator 200 for landing purposes, then the distributor valve 225 empties the annular chamber 224 via the line R and hydraulic fluid under pressure is admitted from line A of the distributor valve 230 into the orifice 229 of the extension body 250, said fluid then flowing via said central hollow rod 245 to penetrate via the lateral orifice 249 thereof into the chamber 228 (as shown by the arrow shown in FIG. 2d). FIG. 2d corresponds to the shock-absorbing actuator being in its fully extended position: the separator piston 226 is then in top abutment against the enlargement 260 of the hollow central rod 245, and the piston portion 208 of the hollow rod 202 is in abutment against the top end of the hollow body 201. If landing is taking place under normal conditions, the shock-absorbing actuator 200 behaves like a conventional shock absorber, i.e. the bottom portion of said shock-absorbing actuator disposed beneath the separator piston 226 placed above the hydraulic fluid wall of the chamber 228 behaves like an end wall for said shock absorber. A certain volume of hydraulic fluid passes from the chamber 227 to the chamber 220, compressing the gas in the low-pressure chamber of the chamber 221. Naturally, and as before, the distributor valve 230 closes automatically at the end of lowering the undercarriage, thereby ensuring that the bottom portion of the shock-absorbing actuator behaves as a single monolithic piece.

In contrast, if landing takes place with a force that exceeds the predetermined threshold (determined by the pins 252 shearing), i.e. if a crash landing situation applies, then the sudden force communicated to the extension body 250 causes the pins 252 to shear, thereby enabling the body 201 to be retracted telescopically into the extension body 250, compressing the composite tube 255 which provides the desired degree of energy absorption by being crushed. FIG. 2a thus shows the final position after such a crash landing, with the shear pins 252 then being broken into pairs of separated portions 252.1 and 252.2, and the composite tube being constituted by a residual tube 255.1, plus an amalgam of pieces or powder 255.2 that result from the composite tube being crushed.

After subsequent take-off, like the above-described shock-absorbing actuator, the shock-absorbing actuator 200 passes progressively from the position shown in FIG. 2b to the extended position shown in FIG. 2d. Thereafter, the chamber 228 is emptied via the central hollow rod 254, the orifice 229 of the extension body 250, and the line R of the distributor valve 230, thereby enabling the separator piston 226 to move back down into low abutment against the end wall 204 of the cylindrical body, the distributor valve 225 admitting fluid under pressure from its line A into the annular chamber 224. The hollow rod 202 thus returns into the cylindrical body 201 and this continues until it comes into abutment against the top edge 244 of said body. The shock-absorbing actuator 200 finally reaches the raised position as shown in FIG. 2c. It will be observed that in this position the enlargement 260 of the central hollow rod 245 is not in contact with the intermediate partition 216 of the hollow rod 202. This contact only takes place in the event of a crash landing, as shown in FIG. 2a.

The invention is not limited to the embodiments described above, but on the contrary extends to any variant that reproduces the above-specified essential characteristics by equivalent means.

What is claimed is:

1. A shock-absorbing actuator for fitting to the landing gear of heavier-than-air aircraft, the actuator comprising a cylindrical body and an open-ended hollow rod forming an annular piston that slides in sealed manner inside the cylindrical body, together with hydraulic damping diaphragm means surmounted by a volume of hydraulic fluid delimiting a low-pressure gas chamber, and force peak-limiting means that come into play in the event of a crash landing, wherein the cylindrical body includes a separator piston that is movable between two associated abutments and delimiting two hydraulic fluid chambers, one of which communicates directly with the inside of the hollow rod in which the hydraulic damping diaphragm means is disposed, and the other of which is adapted to communicate via a first distributor valve with the hydraulic circuit of the aircraft, said first distributor valve being automatically closed at the end of lowering the landing gear, said cylindrical body and said hollow rod also delimiting an annular chamber which is also adapted to communicate via a second distributor valve with said hydraulic circuit, said first and second distributor valves thus making it possible to cause the shock-absorbing actuator to extend or retract in order to lower or raise the landing gear, and wherein the force peak-limiting means is disposed in an extension body extending beyond an end wall of the cylindrical body forming one of the abutments of the separator piston.

2. A shock-absorbing actuator according to claim 1, wherein the force peak-limiting means includes a high-pressure gas chamber disposed in said extension body of the cylindrical body.

3. A shock-absorbing actuator according to claim 2, wherein a moving rod-piston is associated with the high-pressure chamber, said moving rod-piston including a piston sliding in said chamber, and a rod passing through an intermediate end wall of the cylindrical body, said intermediate end wall forming an abutment for the separator piston and having direct communication means including a floatingly-mounted valve member.

4. A shock-absorbing actuator according to claim 3, wherein the hydraulic fluid chamber delimited by the intermediate end wall of the cylindrical body and by the separator piston is adapted to communicate with the hydraulic circuit of the aircraft via a first orifice of said cylindrical body disposed in the vicinity of said intermediate end wall.

5. A shock-absorbing actuator according to claim 3, wherein the separator piston slides on the rod of the moving rod-piston, and the other abutment of said separator piston is carried by said rod.

6. A shock-absorbing actuator according to claim 5, wherein the rod of the moving rod-piston is terminated by an enlargement which constitutes both the other abutment for the separator piston, and an abutment for the hollow rod in a normally-retracted position.

7. A shock-absorbing actuator according to claim 2, wherein the outside of the hollow rod has an end-of-stroke abutment that co-operates with the free edge of the cylindrical body to limit the retraction stroke in the event of a crash landing.

8. A shock-absorbing actuator according to claim 1, wherein the force peak-limiting means comprises a tube which provides the desired energy absorption on being crushed, said tube being received in said extension body which telescopically receives the cylindrical body.

9. A shock-absorbing actuator according to claim 8, wherein the cylindrical body and the extension body are connected together by at least one shear pin that is designed to break under a predetermined force.

10. A shock-absorbing actuator according to claim 8, wherein the extension body carries a central hollow rod that passes through the end wall of the cylindrical body that forms an abutment for the separator piston, said hollow rod having a lateral orifice whereby the hydraulic fluid chamber delimited by said end wall and said separator piston communicates with the hydraulic circuit of the aircraft via an associated orifice of the extension body.

11. A shock-absorbing actuator according to claim 10, wherein the separator piston slides on the central hollow rod of the extension body, and the other abutment of said separator piston is carried by said central hollow rod.

12. A shook-absorbing actuator according to claim 11, wherein the central hollow rod is terminated by an enlargement which constitutes both the other abutment of the separator piston, and an abutment for the hollow rod limiting the retraction stroke in the event of a crash landing.

13. A shock-absorbing actuator according to claim 8, wherein the hollow rod has an outer end-of-stroke abutment co-operating with the free edge of the cylindrical body at the end of normal retraction.

14. A shock-absorbing actuator according to claim 1, wherein deformable anti-rotation means, is provided between the cylindrical body and said extension body which telescopically receives the cylindrical body.

* * * * *